(12) United States Patent
Steiner et al.

(10) Patent No.: US 12,527,420 B2
(45) Date of Patent: Jan. 20, 2026

(54) MOVABLE SHELF SYSTEM BASED ON BODY RECOGNITION

(71) Applicant: Toshiba Global Commerce Solutions, Inc., Durham, NC (US)

(72) Inventors: David John Steiner, Durham, NC (US); Hector Gabriel Ruelas Cobian, Tlaquepaque (MX); Martha E Contreras Ramirez, Zapopan (MX); Alejandra González González, Tlaquepaque (MX); Rafael Lizardo Silva, Colima (MX)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 326 days.

(21) Appl. No.: 18/335,577

(22) Filed: Jun. 15, 2023

(65) Prior Publication Data
US 2024/0415299 A1 Dec. 19, 2024

(51) Int. Cl.
A47F 5/00 (2006.01)
A47F 10/00 (2006.01)
G06V 40/16 (2022.01)

(52) U.S. Cl.
CPC ............ *A47F 5/0093* (2013.01); *A47F 10/00* (2013.01); *G06V 40/16* (2022.01)

(58) Field of Classification Search
None
See application file for complete search history.

(56) References Cited

U.S. PATENT DOCUMENTS

| | | | |
|---|---|---|---|
| 2005/0006331 A1* | 1/2005 | Engel | A47F 5/0081 211/151 |
| 2019/0042851 A1* | 2/2019 | Varadarajan | G06V 40/20 |
| 2021/0070547 A1* | 3/2021 | Basam | E04B 1/34869 |
| 2022/0315352 A1* | 10/2022 | Sun | B65G 47/69 |
| 2023/0140349 A1* | 5/2023 | Chand | G06V 20/52 701/117 |

FOREIGN PATENT DOCUMENTS

JP 2022131209 A * 9/2022 ............ B66B 1/34

OTHER PUBLICATIONS

Rikitake Kenichiro et al., JP-2022131209-A English Translation (Year: 2022).*

* cited by examiner

*Primary Examiner* — Miya J Cato
(74) *Attorney, Agent, or Firm* — Stanek Lemon Crouse & Meeks, PA (57) ABSTRACT

A movable shelf system is provided for a retail or grocery store. The system includes a movable shelf in a store location; an actuator for moving the movable shelf; a plurality of cameras in the store location, each of the plurality of cameras having a field of view; and a vision mesh network having a plurality of nodes in communication with each other, at least one of the plurality of cameras being a node within the plurality of nodes on the vision mesh network. The vision mesh network receives and processes information about the movable shelf and sends an instruction to the movable shelf based on the information.

15 Claims, 11 Drawing Sheets

MOVABLE SHELF SYSTEM BASED ON BODY RECOGNITION

BACKGROUND

Customers at retail locations, for example, grocery stores, may be unable to access items on shelves because the shelves are too high or the items are beyond their reach. Customers, particularly those with limited mobility, may face difficulty and inconvenience when items on the shelves cannot be reached without the help of another person.

BRIEF DESCRIPTION OF THE SEVERAL VIEWS OF THE DRAWINGS

The present disclosure will be explained with reference to the following figures in which:

FIGS. 4A to 4C are diagrams illustrating a customer interacting with a movable shelf system in accordance with some embodiments of the present disclosure.

FIGS. 5A to 5C are diagrams illustrating a customer in an electric shopping car interacting with a movable shelf system in accordance with some embodiments of the present disclosure.

DETAILED DESCRIPTION

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

When a customer is shopping at a retail or grocery store and cannot reach or otherwise access an item on a shelf or display, the customer must seek assistance. Often this assistance comes from another customer or store employee. The customer seeking help is delayed until help is provided. The delays or inconveniences for requesting help, for example, multiple times or for multiple items, may negatively impact the customer's shopping experience. The customer may also be self-conscious or uncomfortable requesting help.

Retail and grocery stores generally include numerous cameras installed around the store to monitor employees, customers, loss prevention, inventory, safety, etc. The cameras may be smart cameras and/or edge cameras and be positioned to provide viewing angles of desired target areas of the store. The target areas may include, for example, point-of-sale areas such as checkout stations and self-checkout stations, ingresses, egresses, aisles, displays, pharmacy areas, etc. The target areas may encompass the entire store and may include overlapping areas and fields of view. The cameras may be connected to one another forming a vision mesh network.

As used herein, an "edge camera" refers to a camera that generally features onboard storage. An edge camera may be used as a security camera that saves recorded video footage data onto the internal storage hardware. Thus, recording at the edge is the recording of video and storing it either in camera or to a directly connected storage device instead of transporting it across the network to a centralized recording facility such as a digital video recorder.

In accordance with some embodiments of the present disclosure, a "vision mesh network" connects cameras around the store directly to each other. The cameras are able to recognize a customer's behavior, including movements and actions, and accommodate the customer. In one example, an edge camera may recognize a customer pointing to an item on a shelf that is out of the reach of the customer, send a command to the shelving unit to lower the shelf, recognize when the customer selects the item and command the shelf to return to the original position.

As used herein, the "vision mesh network" refers to a group or number of cameras connected via a network, for example, a network including Wi-Fi routers, that act as a single network of cameras. Thus, there are multiple sources of data instead of just a single camera. By allowing access to each edge camera around the store, images or data from each edge camera can be used as data inputs for the movable shelf systems. This vision mesh network can be accessed ad-hoc to determine if there are beneficial, additional, or alternative views of target areas that can be used as additional data inputs. Information is shared amongst the vision mesh network so one camera can make a determination about a customer or activity, for example, a customer interacting with a movable shelf system. Input from one, some or all of the cameras in the vision mesh network can be utilized. Increasing the quantity and quality of data inputs that go into a computer vision module for determining accurate operation of the self-checkout station or checkout procedure will improve the accuracy and reliability of the system. While it is possible to centrally manage all camera data streams through a client server architecture, centrally process all inputs and then distribute the results accordingly, the increase in, for example, network resources, data security, and increased latency may present significant impedance to that type of solution.

As used herein, computer vision modules include methods for acquiring, processing, analyzing and understanding digital images, and extraction of high-dimensional data from the real world in order to form decisions. The various embodiments of computer vision modules discussed herein acquire, process, analyze and understand images and data from the vision mesh network and provide feedback and operational decisions regarding a customer, a shopping experience and/or a movable shelf system. In some embodiments, the computer vision module includes body recognition and facial recognition modules that can recognize body movements and facial features, respectively, of the customers to identify and authenticate the customers, determine if the customers need assistance, and assist the customers when items are out of reach. In further embodiments, the modules may be looking at how customers behave while the customers are shopping and how customers behave when assistance is needed.

Figure 1:
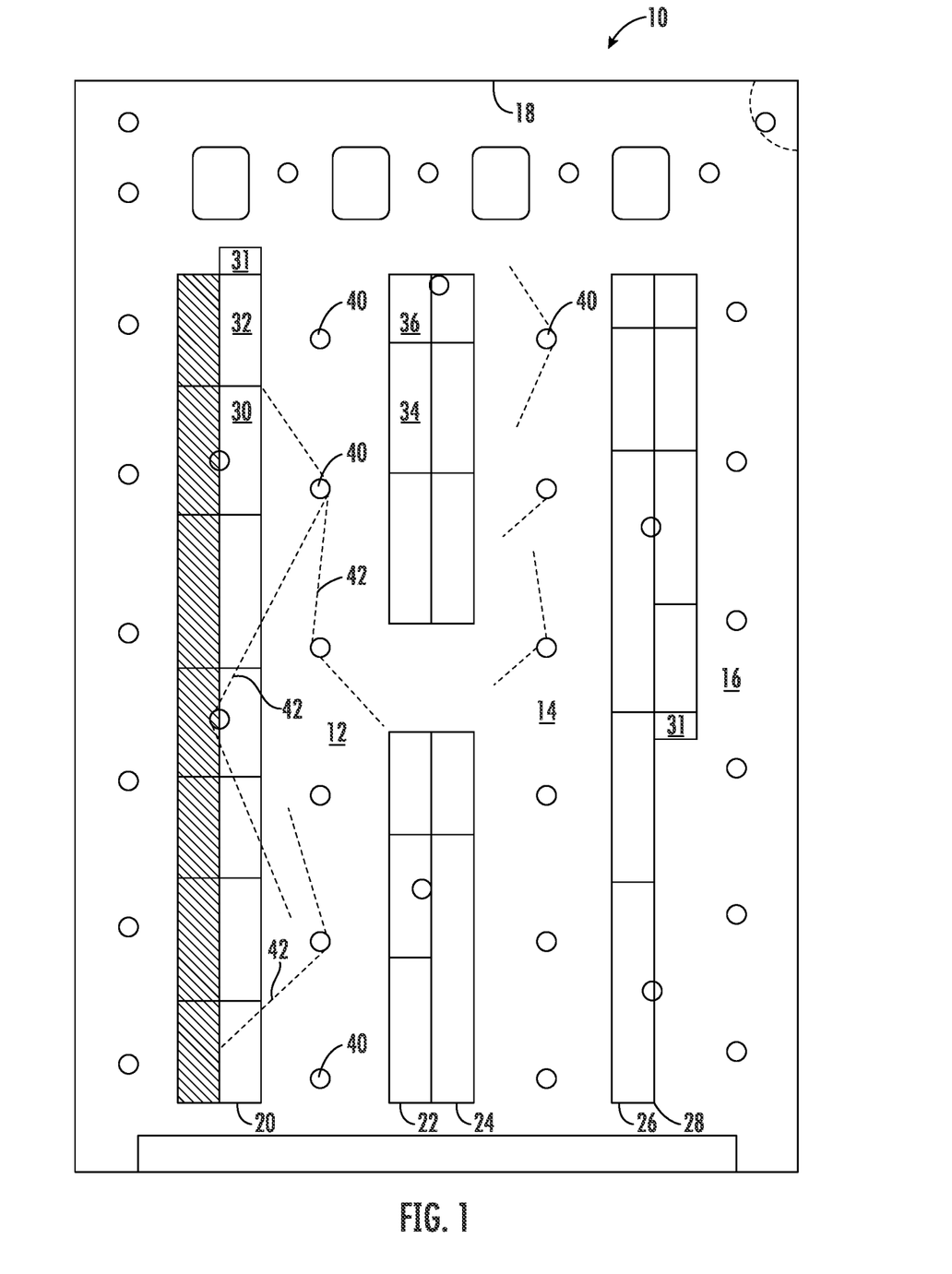
FIGS. 1 and 3 are plan views of a store location having a movable shelf system in accordance with some embodiments of the present disclosure.
Figure 2:
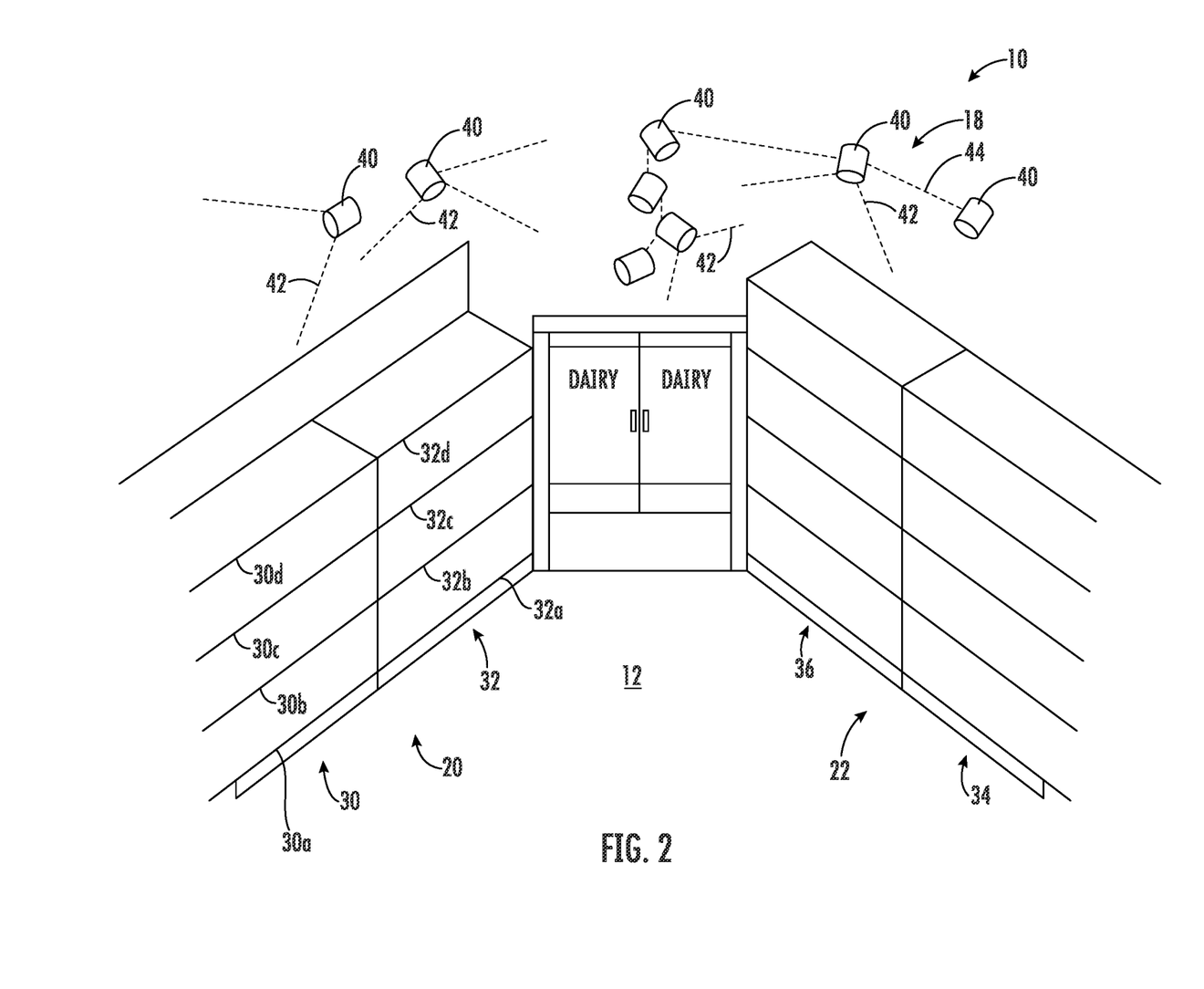
FIG. 2 is a diagram illustrating an aisle with a movable shelf system in accordance with some embodiments of the present disclosure.

Referring first to FIGS. 1 and 2, a movable shelf system 10 at a store location 18 including, for example, a movable shelf 32d, in accordance with some embodiments of the present disclosure will be discussed. As illustrated, the store location 18 includes a plurality of aisles 12, 14, 16 defined by shelving sets 20, 22, 24, 26, 28 adjacent at least one side of the aisles 12, 14, 16. Shelving sets 20, 22, 24, 26, 28 include a plurality of discrete shelving units 30, 32, 34, 36 connected together, arranged together and/or installed in groups or clusters near or next to one another to form shelving sets 20, 22, 24, 26, 28. Shelving units 30, 32, 34, 36 may also stand alone. Shelving units also include endcap shelving units 31, placed at an end of an aisle or shelving set.

As illustrated in FIG. 2, aisle 12 is flanked by shelving sets 20, 22 on left and right sides respectively. Shelving sets 20, 22 include a plurality of discrete shelving units 30, 32, 34, 36, arranged together to form shelving sets 20, 22 and define an aisle 12 of a desired length. Each shelving unit 30, 32, 34, 36 includes at least one shelf and, in one example, includes a plurality of shelves 30a, 30b, 30c, 30d, 32a, 32b, 32c, 32d. At least one shelf is a movable shelf 32d according to an embodiment of the present disclosure. Movable shelf 32d is a "smart shelf" and is programmably controlled and remotely operated. Movable shelf 32d is the upper most shelf of shelving unit 32 as illustrated in FIG. 2.

Any number of movable shelves 32d may be provided. The number and placement of aisles 12, 14, 16, shelving sets 20, 22, 24, 26, 28, shelving units 30, 32, 34, 36, endcaps 31, shelves 30a, 30b, 30c, 30d, 32a, 32b, 32c and movable shelves 32d is adjustable and customizable as desired. In some preferred embodiments of the present disclosure, each discrete shelving unit 30, 32, 34, 36 and endcap includes a movable shelf. In one example, most or all shelves are movable. Customers pass through aisles 12, 14, 16 defined by shelving sets 20, 22, 24, 26, 28 as the customer selects items from the shelves 30a, 30b, 30c, 30d, 32a, 32b, 32c and movable shelf 32d.

Figure 3:
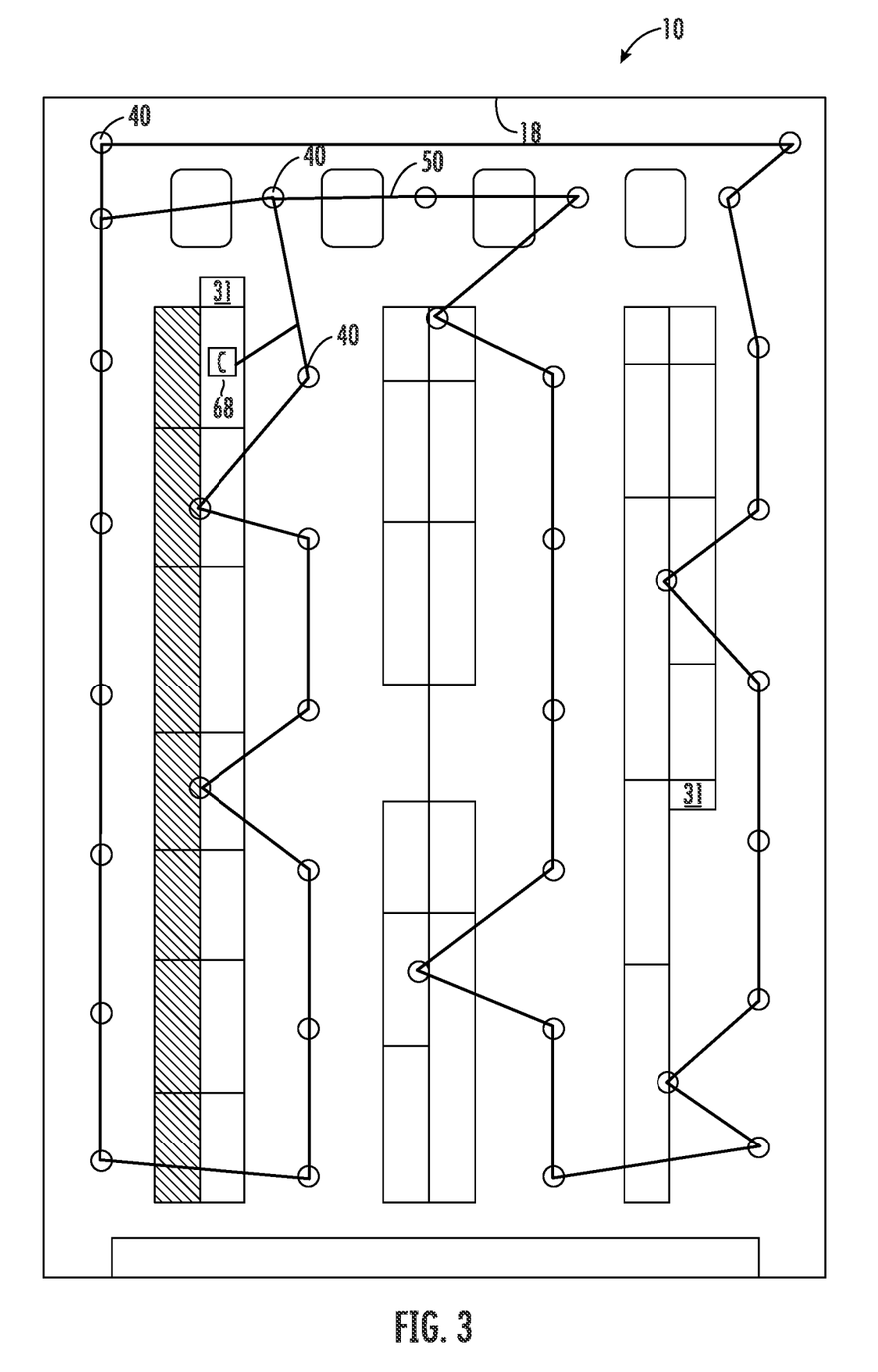

As illustrated in FIGS. 1 to 3, the store location 18 includes at least one edge camera 40. Each edge camera 40 has a corresponding field of view (FOV) 42 associated therewith. The edge cameras 40 are mounted such that the FOV 42 includes a desired target area. The edge cameras 40 may be arranged such that the FOVs 42 overlap one another and/or form a complete view of store location 18. Edge cameras may also be arranged so the FOV 42 is on a selected target area, for example, a focus on movable shelves 32d. In some embodiments of the present disclosure, edge cameras 40 are mounted throughout store location 18 such that the edge cameras 40 can monitor a customer as the customer shops and can recognize when a customer needs assistance while shopping through computer vision including facial recognition and body recognition.

Each edge camera 40 is a node on the vision mesh network 50. Each edge camera 40 is connected to at least one other edge camera 40 or node forming a vision mesh network 50. In one example, each edge camera is directly connected to every other camera 40. Each edge camera 40 may be connected to any number of other edge cameras 40 as desired. The edge cameras 40 are connected to one another in a wired or wireless manner or any combination thereof. Using a wired setup may reduce latency and interference. The edge cameras 40 may be movable or fixed or any combination thereof. It will be understood that some or all edge cameras 40 may be directly connected to each other on the vision mesh network without departing from the scope of the present disclosure. Additional devices may serve as nodes on the mesh network. In one example, further described below with reference to FIGS. 4A to 4C a controller 68 for movable shelf 32d is a node on the vision mesh network 50.

Each of the edge cameras 40 process information and perform calculations on the edge camera 40, including analyzing images and other data, near the source of the data, i.e., at the edge camera 40. Edge computing reduces the likelihood for the need to send images and other data to a central server or cloud service for processing which may increase processing speed and reduce stress on the overall network.

Each of the edge cameras 40 has a designated responsibility area. The edge cameras 40 feed data input, for example, images or video capture, to the designated edge camera which processes the data inputs via computer vision modules which may include face and body recognition modules which outputs operational determinations based on the inputted data. The accuracy of the module is directly linked to the quality and quantity of input data. As discussed above, computer vision modules include methods for acquiring, processing, analyzing and understanding digital images, and extraction of high-dimensional data from the real world in order to form decisions. The various embodiments of computer vision modules discussed herein acquire, process, analyze and understand images and data from the vision mesh network and provide feedback and operational determinations regarding a customer, a shopping experience and/or a movable shelf system. In some embodiments, the computer vision module includes body recognition and facial recognition modules that can recognize body movements and facial features, respectively, of the customers to identify and authenticate the customers, determine if the customers need assistance, and assist the customers when items are out of reach. The computer vision module can watch for gestures of an individual attempting to access a shelf not accessible to them because, for example, the individual is short, a child and/or disabled. The computer vision module can look for behaviors indicative of requesting for assistance including pointing, gesturing or reaching for an item. In further embodiments, the module may be looking at how customers behave while shopping and how customers behave when assistance is needed. For this reason, a plurality of cameras 40 are installed throughout store location 18. The target areas may include, for example, movable shelves 32d and customers who have signed up to receive assistance, for example, through a loyalty program or other opt-in program.

The vision mesh network 50 of FIG. 3 connects the edge cameras 40 around store location 18 so the edge cameras 40 can exchange images or data from any of the connected edge cameras 40 and nodes to the designated camera in the vision mesh network 50. Thus, for example, a movable shelf system 10 in aisle 12, illustrated in FIG. 2, with installed edge cameras 40 can make use of all cameras 40 having FOVS of shelving unit 32 in addition to the remaining edge cameras 40 installed in store location 18. Thus, the vision mesh network 50 allows the system to increase the quality and quantity of data inputs by using images and data from around store location 18 in order to improve results and accuracy and enhance the decision-making capabilities for movable shelf system 10.

It will be understood that the systems illustrated in FIGS. 1 to 3 are provided for example only and, therefore, embodiments are not limited to the configurations shown therein. For example, there may be more or fewer cameras and aisles than illustrated, these aisles may have more or fewer shelving sets, shelving units, shelves and movable shelves and more or fewer features without departing from the scope of the present disclosure.

Figure 4A:
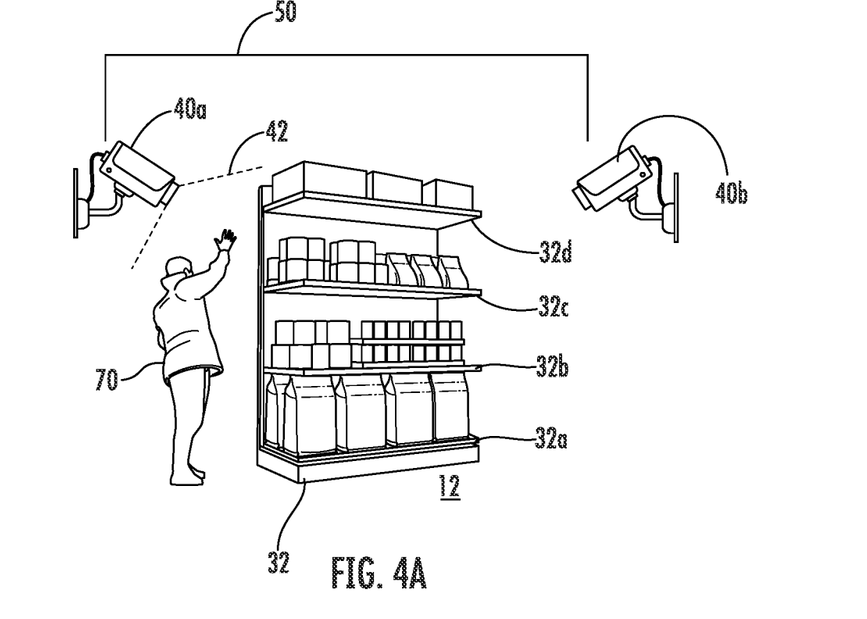
Figure 4B:
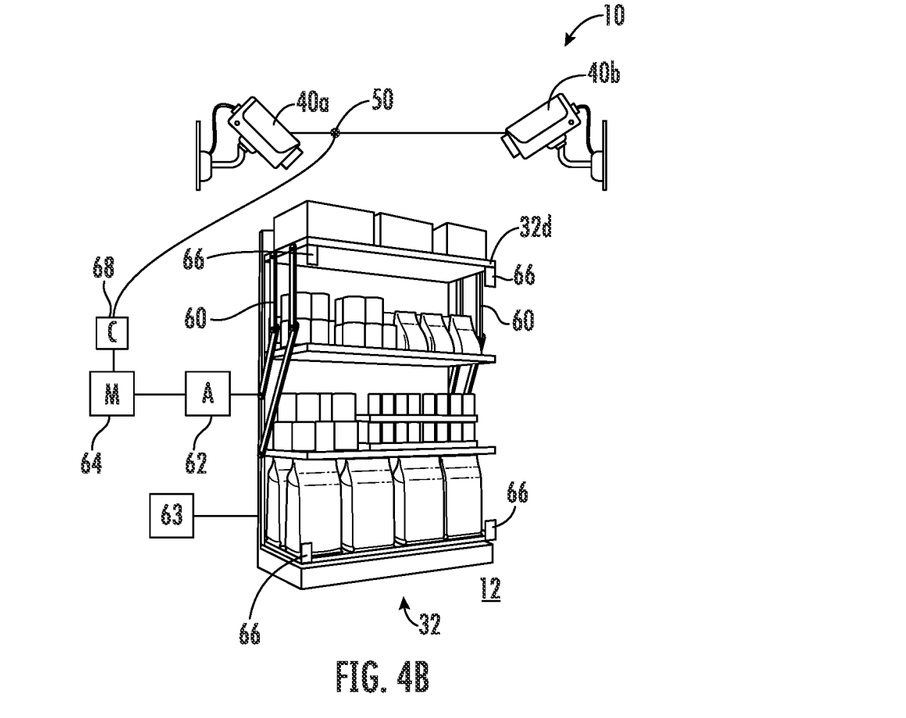
Figure 4C:
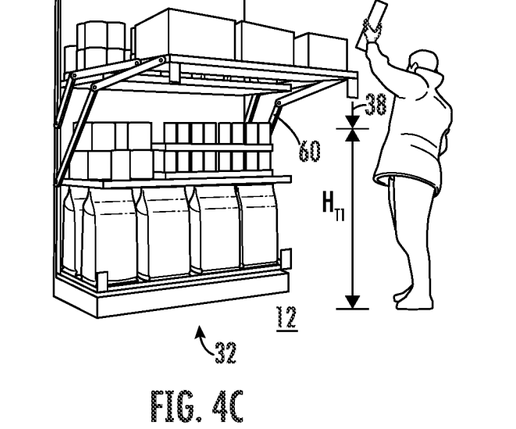

As illustrated in FIGS. 4A to 4C, a customer 70 is unable to reach items on movable shelf 32d because movable shelf 32d is too high. The customer 70 indicates that help is needed by pointing to or reaching for the item that is out of reach. Edge cameras 40a, 40b capture and process the behavior of the customer 70, including the customer's gestures, movements and actions, to determine that the customer 70 is making a request for an out of reach item on movable shelf 32d. Edge cameras 40 identify the behavior of customer 70 as a request for an item using computer vision including body recognition techniques. Once a customer request is identified, the designated camera, for example, camera 40a, sends a command to movable shelf 32d to move to a target location or target height, for example, target height $H_{T1}$, as shown in FIG. 4C.

A movable shelf system 10 according to some embodiments of the present disclosure includes a movable shelf 32d movably connected to shelving unit 32 by, for example, brackets 60 connected to an actuator 62 and a motor 64. The shelving unit 32 or movable shelf 32d may also be connected to a power source. A controller 68 is connected to motor 64 and communicatively connected to edge camera 40a. In one example, as shown in FIG. 3, controller 68 is a node on the mesh network 50. In another example, the controller 68 is not a node on mesh network 50 but is otherwise connected to edge camera 40a. For example, controller 68 may be connected through a wired network, a central server, a control network or a wireless network such as a cloud network.

Movable shelf 32d is programmably controlled and remotely operated by controller 68 and camera 40a. Movable shelf 32d may be a "smart shelf" and can communicate with edge cameras 40. Controller 68 receives instructions from edge camera 40a to lower movable shelf 32d from an initial position to a first target height $H_{T1}$. The first target height $H_{T1}$ may be adjustable and customizable based on personalized characteristics of customer 70. Edge cameras 40 may detect a height of customer 70 and calculate a first target height $H_{T1}$ from the personalized height and characteristics of customer 70 based on images processed with computer vision and body recognition features. In one example, edge cameras 40 determine if customers 70 have limited mobility and adjust the target height or target location accordingly. In another example, the first target height $H_{T1}$ may be a preselected height.

Once the customer 70 interaction with movable shelf 32d is complete, the movable shelf 32d returns to the initial position shown in FIG. 4A. Edge cameras 40 monitor the customer 70 in real-time to determine when the customer 70 is finished interacting with the movable shelf 32d at the target height $H_{T1}$. In one example, the mesh network 50 via edge cameras 40 will determine the customer interaction is complete when the customer 70 leaves the vicinity of shelving unit 32. In other examples, the cameras 40 will use computer vision such as facial recognition and body recognition to determine if the customer 70 is considering taking items off or returning items to the movable shelf 32d. For example, a customer 70 may select an item 80, review the item's nutritional information, then return the item 80 to movable shelf 32d. The edge cameras 40 will see the customer 70 in the FOV 42 reviewing the item 80 and determine that the customer 70 needs more time to complete an interaction with movable shelf 32d. In a further example, the vision mesh network 50 may instruct the movable shelf 32d to return to the initial position after a time limit expires. Once edge cameras 40a, 40b determine the interaction with the movable shelf 32d is complete, edge camera 40a sends an instruction to controller 68 to return movable shelf 32d to the initial position.

The movable shelf system 10 may include sensors 66 located on, near or around movable shelf 32d for detecting obstacles in a path 38 of the movable shelf 32d, for example, if another customer or an item is in the way. The sensors 66 may include infrared lights. A step motor may be provided to stop the movable shelf from moving when an obstacle is in the path 38. Movable shelf system 10 may also include a light, alarm or speaker 63 to generate signals, including lights or sounds, to alert customers nearby that the movable shelf 32d is moving or about to move.

The vision mesh network 50 can monitor customer behavior, actions and characteristics for safety requirements or preferences. For example, vision mesh network 50 may recognize customers as children and ignore requests from a child to prevent a child from accessing candy, pharmaceuticals, tobacco, or alcohol. In another example, vision mesh network 50 may identify shoppers in groups, as couples or as families, and fulfill a request from a child when a family member or group member is nearby. Vision mesh network 50 may receive information from loyalty card holders indicating the customer's preferences regarding interacting with the movable shelf system 10 and vision mesh network 50.

The movable shelf system 10 uses data and images acquired, gathered and processed by mesh network 50 to accommodate a customer's request for an out of reach item on a movable shelf 32d. The vision mesh network 50 allows the designated camera 40a to directly communicate with other edge cameras and nodes on the vision mesh network 50. The designated edge camera 40a for shelving unit 32 can utilize additional images from edge camera 40b and other edge cameras 40 as additional inputs to augment and enhance the results and determinations made regarding customer 70, a request for an out of reach item and movable shelf 32d. The direct communication increases the speed of data exchange ensuring that the potential multiple data inputs can be processed in real or near-time by the designated edge camera 40a without increasing network traffic, data security requirements or latency. As used herein, "real or near-time" includes the actual amount of time the customer spends at the movable shelf 32d and a reasonable delay which may be in the order of a few minutes. By making use of the edge cameras 40 as a mesh of data inputs, the system may increase accuracy without increasing the number of assets and costs of the system. The vision mesh network 50 expands the use of available edge cameras 40 to increase efficacy.

For example, edge cameras 40 may observe the behavior of a customer 70 shopping at store location 18 such that edge cameras 40 know the customer 70 prefers to read nutrition labels prior to placing items in the shopping cart. This behavior can be associated with customer 70 as the customer walks through aisles 12, 14, 16. Thus, when customer 70 arrives at shelving unit 32, the mesh network 50 already includes information about the customer's shopping behavior that can be used in the determinations concerning movable shelf system 10. In this example, a predetermined time limit on movable shelf 32d may be extended or the customer stepping away from the movable shelf 32d may not be recognized as the end of the interaction.

In some embodiments of the present disclosure, the cameras are visual cameras and, unlike edge cameras, do not perform processing therein. The visual cameras are connected to a processor located at the store location or offsite. The processor performs the necessary computing and sends the required instructions to the movable shelf. The visual cameras may be connected to one another or the processor via a network, for example, a fiber optic network.

Figure 5A:
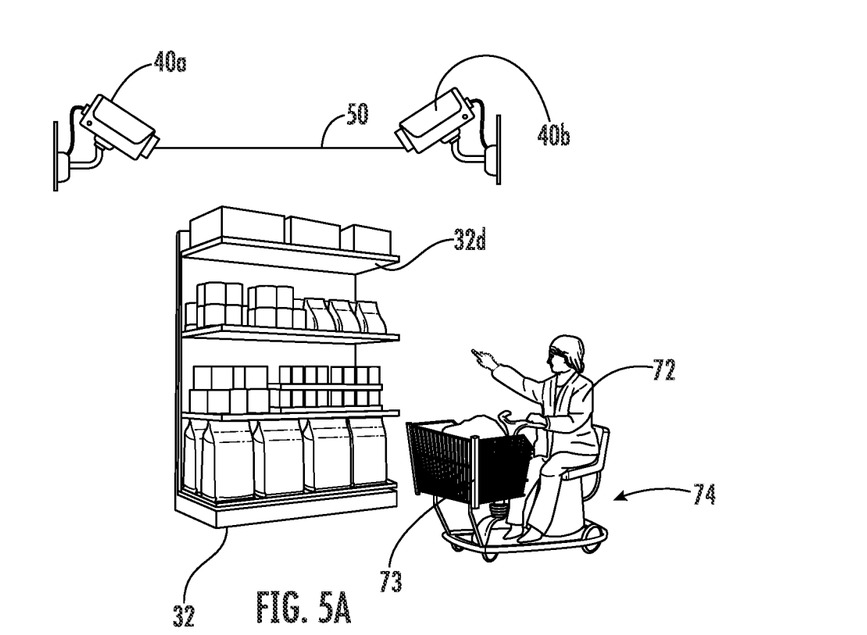
Figure 5B:
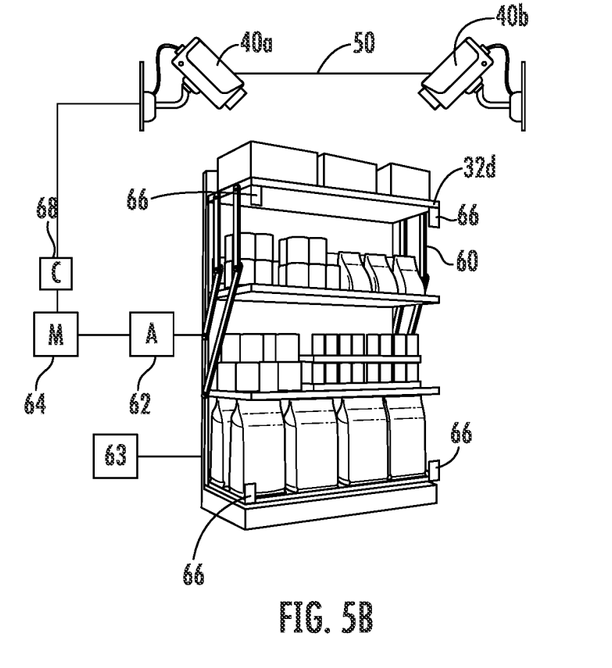
Figure 5C:
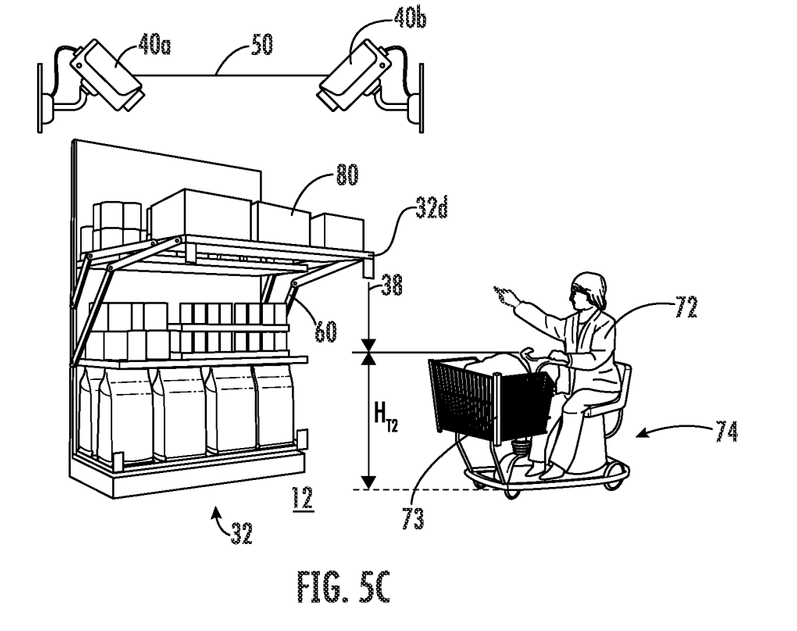

FIGS. 5A to 5C show a customer 72 in an electric shopping car 74 advantageously using movable shelf system 10 in accordance with some embodiments of the present disclosure. The customer 72 indicates that help is needed by pointing, reaching, nodding or making another visually or audibly identifiable gesture towards the item or movable shelf 32d that is out of reach. Edge cameras 40 capture and process the behavior of the customer 72, including the customer's movements, gestures and actions, to determine that the customer 72 is making a request for an out of reach item on movable shelf 32d. Edge cameras 40 may identify the behavior of customer 72 as a request for an item using computer vision including body recognition and facial recognition techniques. Once a determination is made, the designated camera 40a, sends a command to movable shelf 32d to move to from an initial position to a target location or target height $H_{T2}$, as shown in FIG. 5C. When accommodating a customer 72 in an electric shopping car 74, the movable shelf system 10 may lower movable shelf 32d to a second target height $H_{T2}$ that is at or near the level of the customer 72 seated in the electric shopping car 74 and for example, adjacent basket 73, so the customer 72 can easily access items on the lowered movable shelf 32d. The second target height $H_{T2}$ may be adjustable and customizable based on personalized characteristics of customer 72 or, for example, the target height $H_{T2}$ may be a preselected height. The second target height $H_{T2}$ may be lower than the first target height $H_{T1}$ shown in FIGS. 4A to 4C. Edge cameras 40 monitor the customer 72 in real-time to determine when the customer 72 is finished interacting with the movable shelf 32d at the target height $H_{T2}$. Once edge cameras 40 determine the interaction is complete, edge camera 40a directs movable shelf 32d to return to the initial position via controller 68, motor 64 and actuator 62.

Figure 6A:
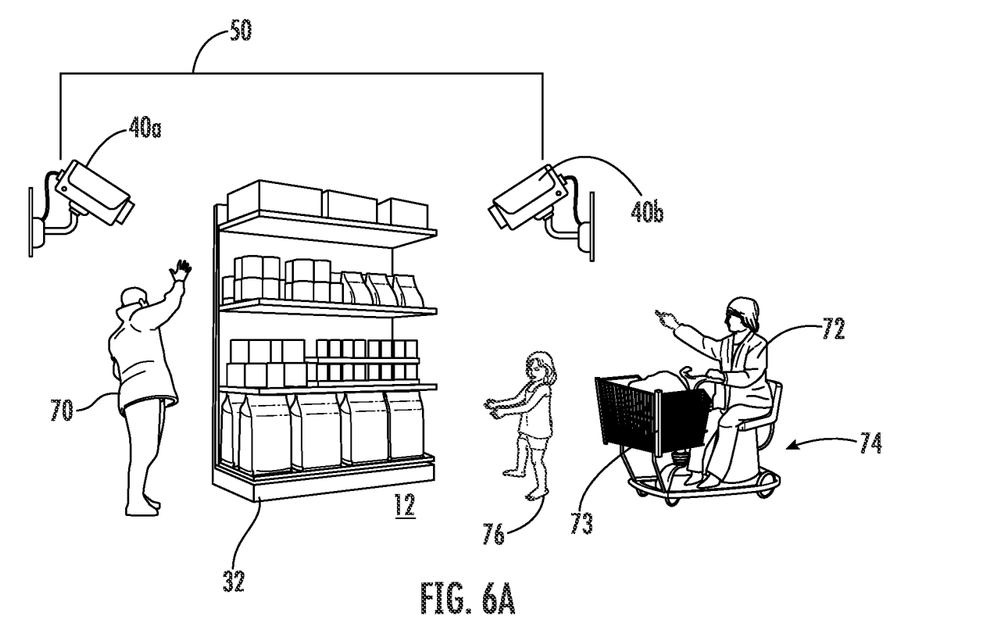
FIGS. 6A and 6B are diagrams illustrating a plurality of customers interacting with a movable shelf system in accordance with some embodiments of the present disclosure.
Figure 6B:
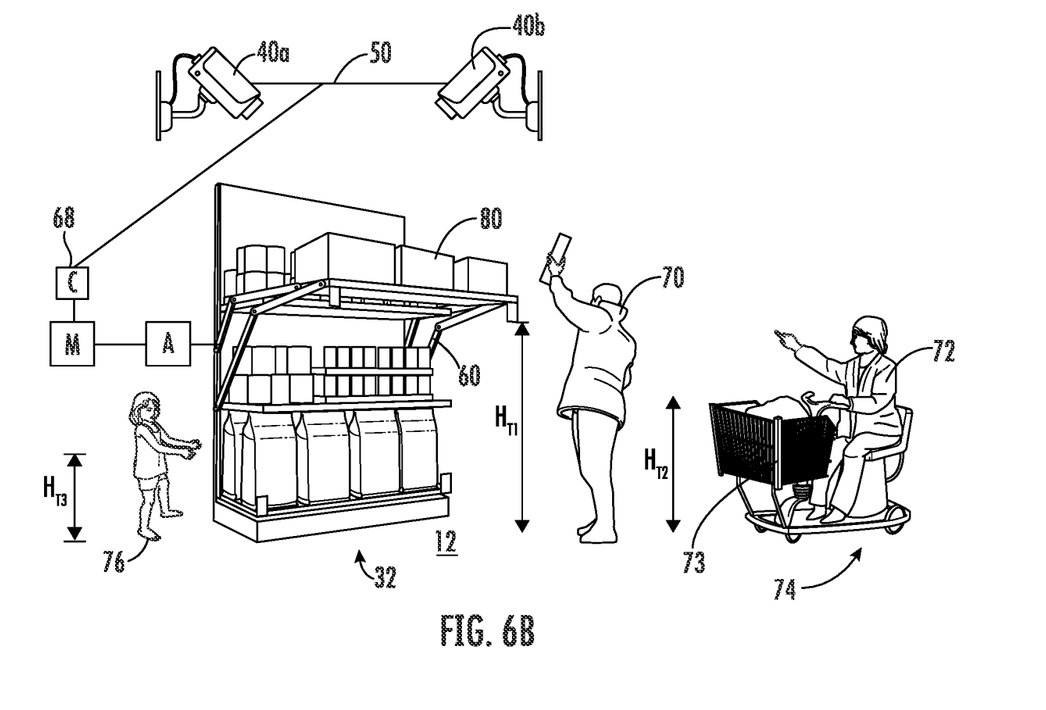

FIGS. 6A and 6B show a plurality of customers 70, 72, 76 using movable shelf system 10 in accordance with some embodiments of the present disclosure. Customer 70 is of average height, customer 72 is seated in an electric shopping car 74 and customer 76 is a child and shorter in height than an average adult. When a plurality of customers 70, 72, 76 arrive at shelving unit 32, the movable shelf system may function in various ways to assist each customer.

In one example, the mesh network identifies which customer 70, 72, 76 arrived first and processes the customers on a first come, first served basis as described above with respect to FIGS. 4A to 5C. The first customer 70 is identified by the vision mesh network as the "controlling customer" and is the first customer to be assisted. The first customer 70 requests help through body movements, for example, pointing or gesturing towards the item or movable shelf 32d that is out of reach. Edge cameras 40 identify the behavior of customer 70 as a request for an out of reach item using computer vision including body recognition and facial recognition techniques. The designated camera 40a, sends a command to movable shelf 32d to move to from an initial position to the first target height $H_{T1}$, as shown in FIG. 6B. Customer 70 completes the interaction by selecting an item off the movable shelf 32d at the first target height $H_{T1}$. Edge cameras 40 monitor the customer 70 in real-time to determine when the customer 70 is finished interacting with the movable shelf 32d at the first target height $H_{T1}$ using computer vision and body recognition. Once the vision mesh network 50 determines the "controlling" customer's 70 interaction is complete, the vision mesh network 50 transfers the "controlling customer" designation to the next customer, customer 72.

In some embodiments, edge camera 40a may instruct movable shelf 32d to return to the initial position, prior to assisting additional customers 72, 76. In some embodiments, and as shown in FIG. 6B, edge camera 40a does not return movable shelf 32d to the initial position between customers 70, 72, 76, rather edge camera 40a instructs movable shelf 32d to lower to the second target height $H_{T2}$, so customer 72 riding electric car 74 can access movable shelf 32d. Once vision mesh network 50 determines the interaction with customer 72 is complete, the mesh network designates customer 76 as the "controlling customer." The mesh network 50 assists the next customer 76 by further lowering movable shelf 32d to a lower, third height $H_{T3}$, so customer 76 can access movable shelf 32d. Once vision mesh network 50 determines the interaction with customer 76 is complete and there are no further customer requests pending, movable shelf 32d is instructed to return to the initial position.

In some embodiments, when vision mesh network 50 receives more than one request from a plurality of customers 70, 72, 76, the system 10 will identify a common target height that is accessible to more than one customer and/or to most or all customers. For example, as shown in FIG. 6B, movable shelf 32d could be lowered to third target height $H_{T3}$ initially, to assist customers 70, 72 and 76 simultaneously, as opposed to lowering to the first target height $H_{T1}$, second target height $H_{T2}$ and third target height $H_{T3}$. In some embodiments, the vision mesh network 50 can recognize when customers may have limited mobility, such that, the lowest target height may be too low and movable shelf 32d may need to be adjusted thereafter to accommodate that particular customer.

Figure 7:
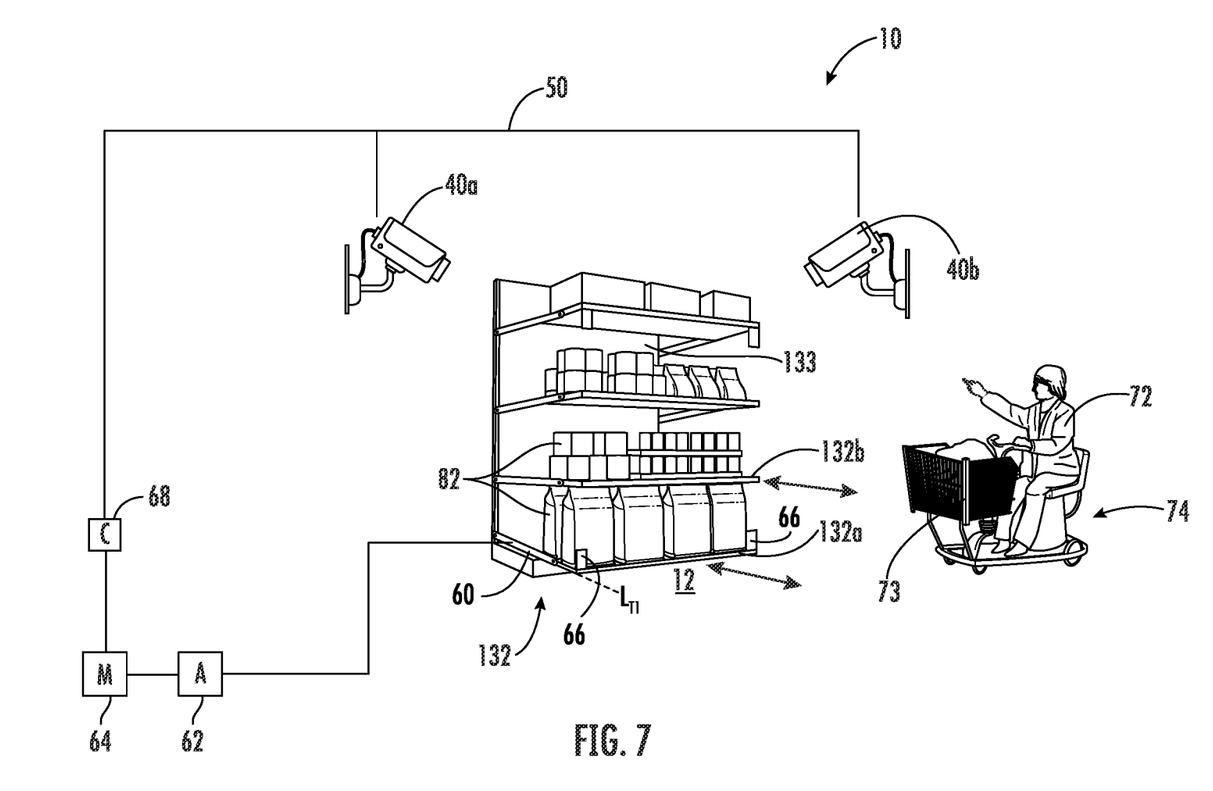
FIG. 7 is a diagram illustrating a movable shelf system in accordance with some embodiments of the present disclosure.

As shown in FIG. 7, movable shelf system 10 includes a shelving unit 132 including movable shelves 132a, 132b which are the lowest two shelves of shelving unit 132. Movable shelves 132a, 132b extend laterally, outward, away from a back wall 133 of shelving unit 132 as indicated by arrows in FIG. 7. Items 82, near the back wall 133 of shelves 132a, 132b, can be difficult for customers to reach. In this embodiment, the customer 72 indicates that help is needed by pointing, nodding or making another visually identifiable gesture towards the item 82 on movable shelf 132a that is out of reach. Edge cameras 40 acquire, capture, process and identify the behavior of customer 72 as a request for an out of reach item 82 using computer vision including body recognition and facial recognition techniques. Once a customer request is identified, the designated camera 40a, sends a command to movable shelf 132a to move to from an initial position to a target location $L_{T1}$, as shown in FIG. 7, making items on a back portion of movable shelf 132a easier for customer 72 to access. In addition, movable shelves 132a, 132b may be moved in any direction. Thus, movable shelf 132d may be commanded to extend both laterally and vertically so a customer 72 riding an electric shopping car 74 can easily reach the item 82 without leaning over or with less effort. Once the vision mesh network 50 determines the interaction is complete, the vision mesh network 50 directs movable shelf 132a to return to the initial position via edge camera 40a, controller 68, motor 64, actuator 62 and brackets 60 as described above.

It will be understood that the configurations illustrated in FIGS. 1 to 7 are provided as an example only and that embodiments of the present disclosure are not limited thereto.

Figure 8:
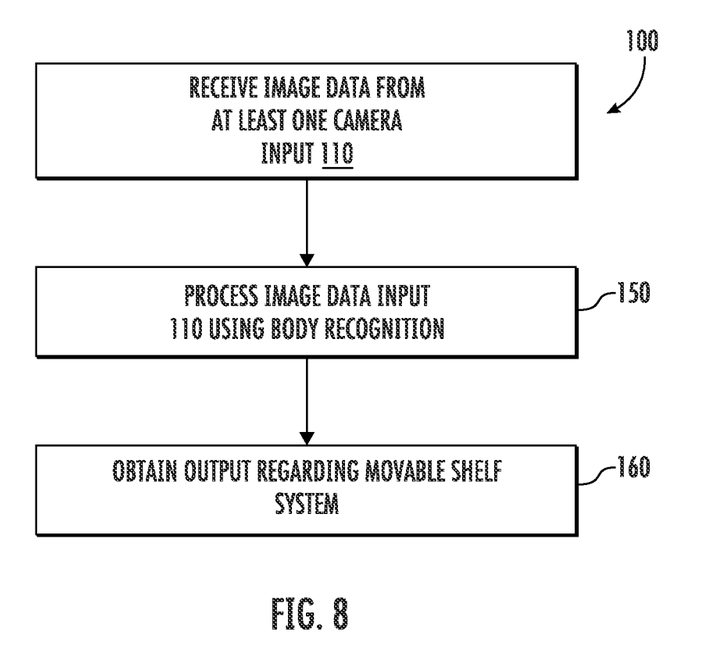
FIG. 8 is a flow diagram illustrating a movable shelf system in accordance with some embodiments of the present disclosure.

FIG. 8 is a flow diagram illustrating a movable shelf system 100 in accordance with some embodiments of the present disclosure. Inputs 110 concerning one or more customers 70, 72, 76 and/or a movable shelf 32d (FIGS. 4A to 6B) are entered into a processor 150. Inputs 110 are obtained from edge cameras 40 mounted in store location 18. The inputs 110 are processed using computer vision including body recognition and facial recognition techniques 150 and an output is provided 160 regarding the movable shelf system 100.

Figure 9:
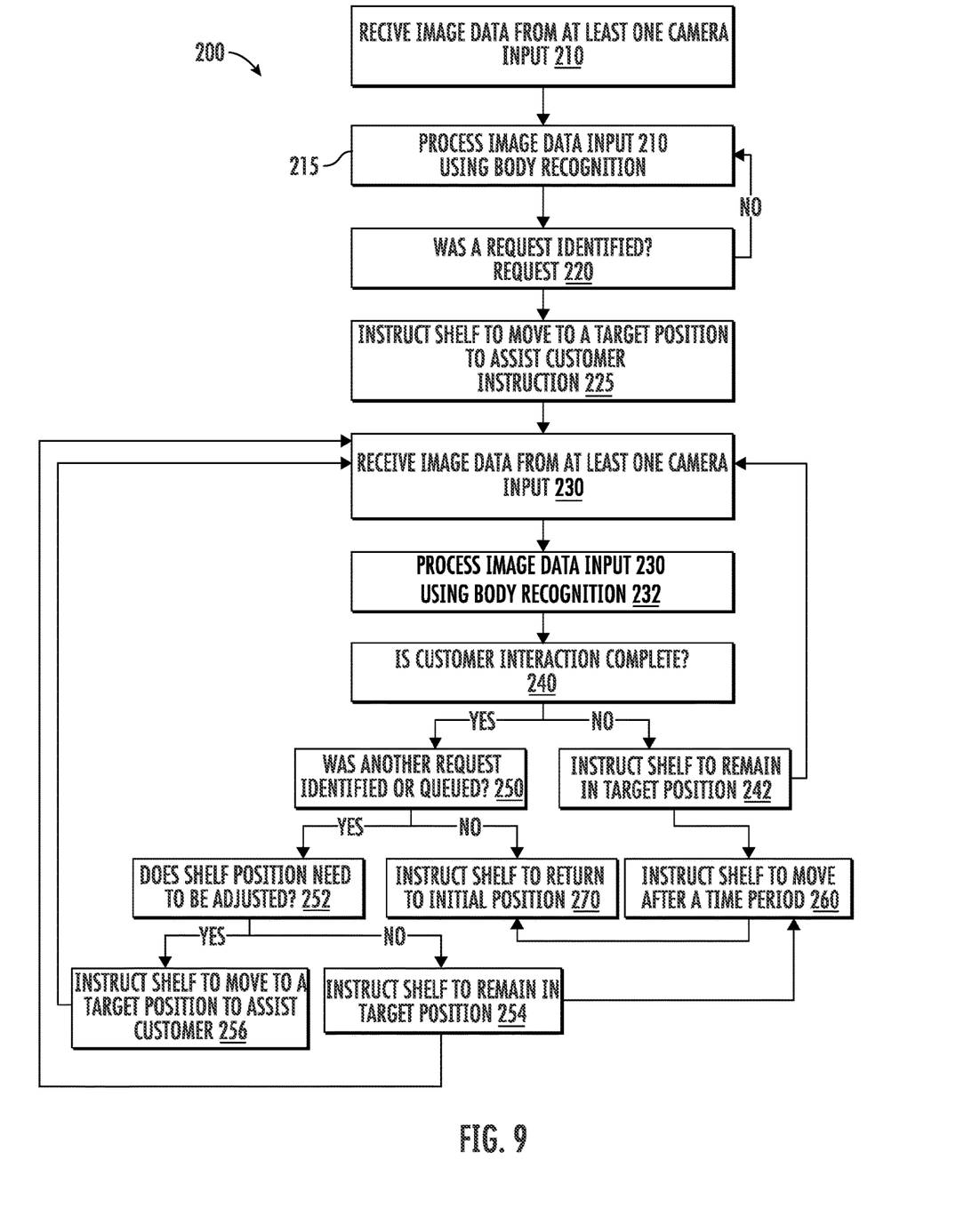
FIG. 9 is a flow diagram illustrating a movable shelf system in accordance with some embodiments of the present disclosure.

FIG. 9 is a flow diagram illustrating a movable shelf system 200 in accordance with some embodiments of the present disclosure. Referring now to FIG. 9 together with FIG. 4C, Inputs 210 concerning one or more customers and/or a movable shelf 32d are entered into a processor 215 and processed using computer vision including body recognition techniques to determine if a customer request 220 has been identified. If a customer request 220 is not identified, the processor 215 continues to process inputs until a customer request is identified. Inputs 210 are obtained from edge cameras 40 in store location 18.

When a customer request 220 is identified, instructions are sent to move a movable shelf 32d to a target position, target height $H_{T1}$, so the customer 70 can access items 80 on the lowered movable shelf 32d. Inputs 230 concerning the customer 70 and movable shelf 32d are continually processed using computer vision including body recognition and facial recognition techniques 232 to determine if the customer 70 is finished interacting with the movable shelf system 240. If the customer 70 is not finished, the movable shelf with remain at the target height $H_{T1}$ until the customer is finished or until the interaction reaches a time limit 260 and the movable shelf 23d is returned to an initial position 270. The time limit may be a default period of time programmed into movable shelf system 200. The system 200 can also move the movable shelf 32d again if a height or position adjustment is needed.

When the system 200 detects a customer request is complete 240, the system 200 will consider whether another customer request was made or queued during the first customer interaction 250. For example, did edge cameras 40 detect a second customer needing assistance at shelving unit 32. If no additional requests are outstanding, the movable shelf 32d will return to the initial position 270. If additional requests are outstanding 250, the system will determine if the shelf needs to be moved to another position 252 to assist the next customer, if the shelf should remain in the target position for an additional time 254 or if the shelf should return to the initial position. If the shelf needs to move, a new target position is identified, and the shelf is instructed to move 256.

As discussed above, some embodiments of the present disclosure provide a vision mesh network that allows data from a multitude of cameras to be shared and for the relevant data to be processed to provide an accurate outcome for the movable shelf system. For example, the images provided using the vision mesh network may provide information to determine if a customer cannot reach an item on a shelf. Thus, some type of data processor is needed to process the data provided using the mesh network. As explained above, in accordance with an embodiment of the present disclosure, each of the edge cameras 40 process information and perform calculations on the edge camera 40, including analyzing images and other data.

Figure 10:
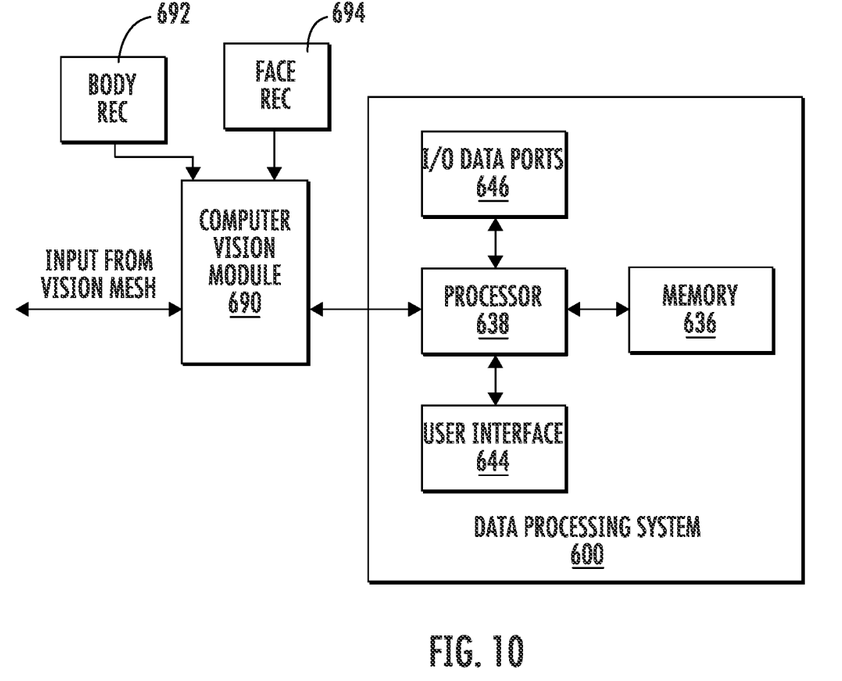
FIG. 10 is a basic block diagram of a data processor that can be used to process data provided through the vision mesh network in accordance with some embodiments of the present disclosure.

Referring now to FIG. 10, a data processor 600 is in communication with a body recognition module 690 that receives inputs from the vision mesh 50 (FIGS. 1 and 2) will be discussed. It will be understood that the data processor may be included in any component of the system without departing from the scope of the present disclosure. For example, the data processor may be present in the movable shelf system 10 (FIGS. 1 and 2) or may be centrally located.

As illustrated, FIG. 10 is a block diagram of an example of a data processing system 600 suitable for use in the systems in accordance with embodiments of the present disclosure. The data processing may take place in any of the devices (or all of the devices, for example, in each edge camera 40 (FIGS. 1 to 3)) in the system without departing from the scope of the present disclosure. The data processing system 600 includes a user interface 644 such as a keyboard, keypad, touchpad, voice activation circuit or the like, I/O data ports 646 and a memory 636 that communicates with a processor 638. The I/O data ports 646 can be used to transfer information between the data processing system 600 and another computer system or a network. These components may be conventional components, such as those used in many conventional data processing systems, which may be configured to operate as described herein. A computer vision module 690 which may include body recognition module 692 and facial recognition module 694 processes inputs from mesh network 50 and communicates with mesh network 50 and data processing system 600.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Furthermore, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Furthermore, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the present disclosure, reference is made to "customer interaction." As used herein, the term "customer interaction" is used broadly to refer to any part of a process for carrying out a transaction or act at a retail location, such as selecting an item for purchase. The specific steps involved may vary depending upon the retailer, the customer, the store configuration and the shelving units.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which various embodiments described herein belong. It will be further understood that terms

What is claimed is:

1. A movable shelf system for a retail or grocery store comprising:
   a movable shelf in a store location;
   an actuator for moving the movable shelf;
   a plurality of cameras in the store location, each of the plurality of cameras having a field of view; and
   a vision mesh network having a plurality of nodes in communication with each other, at least one of the plurality of cameras being a node within the plurality of nodes on the vision mesh network;
   wherein the vision mesh network receives and processes information about the movable shelf and sends an instruction to the movable shelf based on the information; and
   wherein the vision mesh network determines when a customer requests assistance regarding an item on the movable shelf.

2. The movable shelf system of claim 1, wherein the vision mesh network processes information using a computer vision model.

3. The movable shelf system of claim 2, wherein the computer vision model includes body recognition or facial recognition.

4. The movable shelf system of claim 2, wherein the information includes images.

5. The movable shelf system of claim 1, wherein at least one of the plurality of cameras is an edge camera, the edge camera receiving and processing the information and sending the instruction to the movable shelf.

6. The movable shelf system of claim 1, wherein the information includes images.

7. The movable shelf system of claim 1, wherein the plurality of cameras are edge cameras, the edge cameras are nodes within the plurality of nodes on the vision mesh network and the edge cameras are in communication with each other.

8. The movable shelf system of claim 1, wherein the plurality of cameras are wired together or connected wirelessly.

9. The movable shelf system of claim 1, wherein the movable shelf is lowered to a target height in response to the customer request.

10. The movable shelf system of claim 9, wherein the vision mesh network determines if an obstacle is in a path of the movable shelf.

11. The movable shelf system of claim 10, wherein the movable shelf does not move or stops moving if an obstacle is detected in the path.

12. The movable shelf system of claim 1, wherein the vision mesh network determines when the customer request has been completed and sends an instruction to the movable shelf based on the completed request.

13. The movable shelf system of claim 1, further comprising a controller connected to the movable shelf, the controller being a node on the vision mesh network.

14. The movable shelf system of claim 1, further comprising a control network, the movable shelf connected to the control network via a controller and the vision mesh network connected to the control network.

15. The movable shelf system of claim 14, wherein the control network is a cloud network.

* * * * *